March 13, 1945. W. W. CARTER 2,371,503
HYDRAULIC BRAKE
Filed July 1, 1944 2 Sheets-Sheet 1

INVENTOR.
William W. Carter
BY
ATTORNEY.

March 13, 1945. W. W. CARTER 2,371,503
HYDRAULIC BRAKE
Filed July 1, 1944 2 Sheets-Sheet 2

INVENTOR.
William W. Carter
BY
ATTORNEY.

Patented Mar. 13, 1945

2,371,503

UNITED STATES PATENT OFFICE 2,371,503

HYDRAULIC BRAKE

William W. Carter, Kansas City, Mo.

Application July 1, 1944, Serial No. 543,121

10 Claims. (Cl. 188—86)

This invention relates to hydraulic brake structure of the character adaptable for use on automobiles or the like, and has for its primary aim to provide effective, rugged and positively acting means for applying braking action to a movable part when the specially designed, manually operable apparatus is actuated.

One of the primary aims of this invention is the provision of hydraulic brake structure having as a component part thereof, a plurality of specially disposed brake shoes, housed within a closed drum filled with liquid and longitudinally shiftable by manually operable apparatus to engage the inner surfaces of the ends of the brake drum as radial, bodily shifting occurs to contribute toward a positive locking together of the said brake shoes and drum.

Other objects of the invention include the provision of a plunger mounted upon the brake drum for radial movement as the brake shoes are radially shifted, as just above set forth, which plunger is adapted to receive the force of liquid within the drum to a progressively greater degree as the brake shoes are shifted radially to have a relatively small portion of the outer faces thereof come into engagement with a like portion of the inner face of the side wall of the brake drum.

This invention has for a further aim the provision of a hydraulic brake structure having cooperating, closed liquid filled brake drum and a pair of shiftable brake shoes between which a segmental expansion ring is disposed, said ring being operably joined to manually controlled apparatus for forcing the expansion ring between the brake shoes to thereby bring the edges of the brake shoes into frictional engagement with the inner surfaces of the end walls of the brake drum.

Further important objects will appear during the course of the following specification, referring to the accompanying drawings, wherein.

Figure 1:
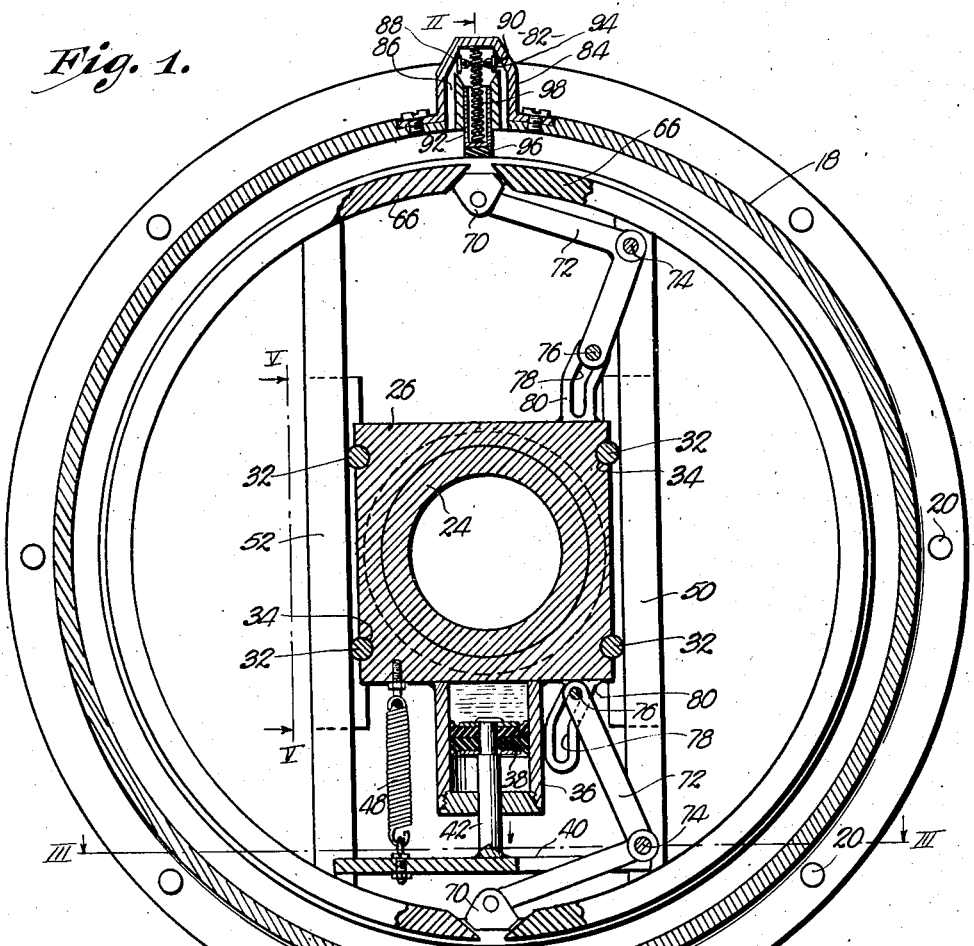
Fig. 1 is a cross sectional view through the hydraulic brake structure embodying this invention, and taken on line I—I of Fig. 2.

The illustrated embodiment of the invention shown in the accompanying drawings clarifies the manner in which the invention may be built into a conventional brake for automobiles. The numeral 10 designates a closed brake drum adapted to be mounted on a rotatable element such as the automobile wheel, not here shown, through the medium of bolts or analogous means 12.

The brake drum comprises flat end walls 14 and 16 respectively, and an annular side wall 18. Wall 16 may be removably affixed in position by machine screws 20 for purpose of assembly, and the entire drum is mounted upon a stationary part generally designated by the numeral 22 and which is in its specific form an axle housing 24 about which may be positioned a bushing 26 welded or otherwise fastened to axle housing 24. Friction bearings and an oil seal 28 and 30 respectively, circumscribe the stationary part 22 and insure free rotation by drum 10 thereabout.

Figure 6:
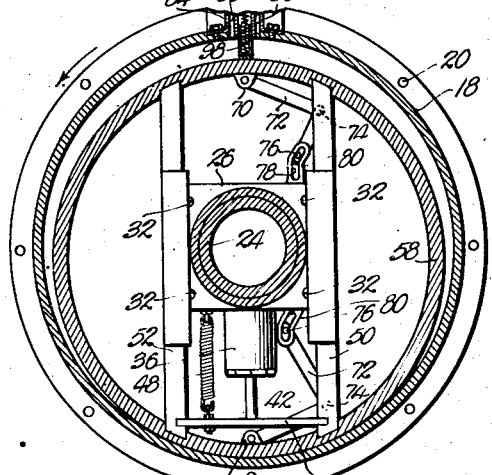
Fig. 6 is a sectional view similar to Fig. 1, but showing the brake shoes radially shifted into contact with the brake drum.

Bushing 26 is polygonal in cross section as illustrated in Figs. 1 and 6, and carries a number of rollers 32 in grooves 34. This relatively stationary bushing 26 has a cylinder 36 secured thereto wherein is operably mounted a piston 38 joined to cross head 40 by rod 42. Cylinder 36 is joined to conventional, manually operable apparatus by a tube 44 and passages 46. A retrieving spring 48 has one end attached to bushing 26 and the other end secured to cross head 40 for purposes more fully hereinafter set down.

Figure 3:
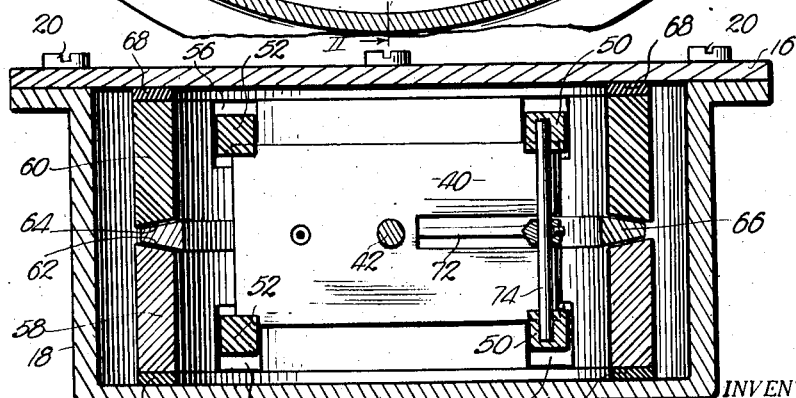
Fig. 3 is a sectional view taken on line III—III of Fig. 1 and looking in the direction of the arrows.
Figure 2:
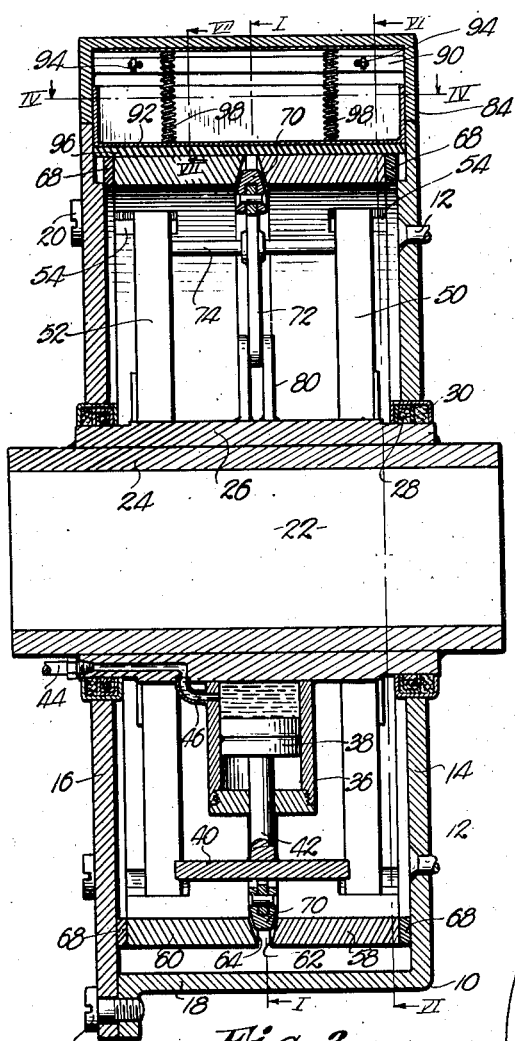
Fig. 2 is a longitudinal sectional view taken on line II—II of Fig. 1.
Figure 4:
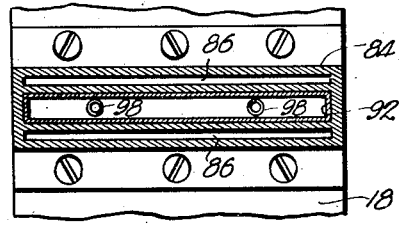
Fig. 4 is an enlarged fragmentary sectional view taken on line IV—IV of Fig. 2.
Figure 5:
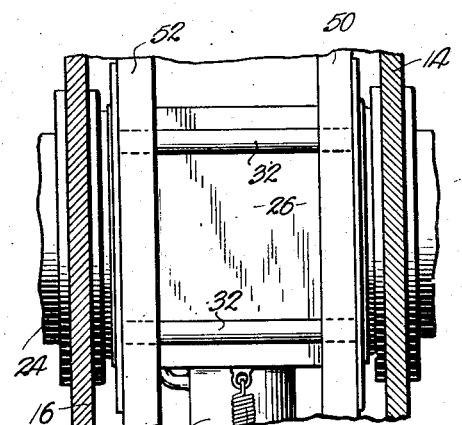
Fig. 5 is a fragmentary sectional view taken on line V—V of Fig. 1.

A pair of arms is arranged on each side respectively of bushing 26. Arms 50 constitute a pair to one side of bushing 26, while arms 52 are on the opposite side of the bushing. The ends of these arms are slidably fitted into cavities 54 and 56 formed in brake shoes 58 and 60 respectively. These shoes are annular and continuous. They are spaced apart as illustrated in Fig. 3, and the proximal edges 62 and 64 of brake shoes 58 and 60 respectively, are inclined to present a wedge-shaped space between the said brake shoes into which is fitted the segmental expansion ring 66. This ring is in two sections and when the parts of the brake drum structure are normal and not applying braking force, brake shoes 58 and 60 are concentric so far as wall 18 of drum 10 is concerned, and the sections of expansion ring 66 have their ends spaced apart, as clearly shown in Fig. 1. The outer edges of brake shoes 58 and 60 which are faced with leather or the like 68, are not against the end walls 14 and 16 of drum 10 when the brake is in the position illustrated in Fig. 1.

The sections of expansion ring 66 have heads 70 disposed therebetween. These heads are inclined to be complementary to the angles of inclination of the ends of segmental expansion ring 66, to the end that radial movement of heads 70 will force the sections of expansion ring 66 apart and thereby into place between brake shoes 58 and 60 to expand the same. The proximal ends of the sections of expansion ring 66 are inclined to present a progressively increasing space as the axis of the brake is approached and heads 70 are engageable with the ends of the ring sections.

Each head 70 is pivotally mounted on one free end of a bell-crank lever 72. The elbow of said lever is pivotally mounted as at 74 to arms 50 to one side of bushing 26. The other free ends of these bell-crank levers 72 have pins 76 that enter slots 78 in a pair of opposed ears 80 rigid to bushing 26. These slots 78 have an inclined length and a length parallel to arms 50, and therefore, parallel to the path of travel of the arms when radial shifting of the parts occur as later set forth.

Annular side wall 18 of drum 10 carries a plunger assembly indicated by the numeral 82, and specifically comprising a housing 84 having liquid passageways 86 wherein a pair of valves 88 and 90 are disposed. These valves are yieldably supported and coupled as at 94 to move as a unit.

Figure 7:
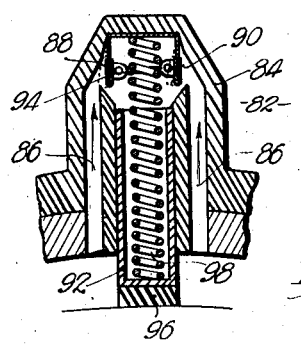
Fig. 7 is an enlarged fragmentary cross sectional view taken on line VII—VII of Fig. 2.

The plunger 92 per se, has a facing 96 of leather or similar substance, and is hollow as seen in Figs. 1 and 7. A pair of compression springs 98 exert a slight inward radial force upon plunger 92 to overcome any centrifugal action. Valve 88 allows the passage of liquid into plunger 92 when the liquid is moving in the direction of the arrow shown in Fig. 7, and valve 90 allows the entrance of liquid into plunger 92 when the liquid is moving through passageways 86 in the direction of the arrow shown in Fig. 7. The valves 88 and 90 move against the adjacent face of housing 84 in the event liquid attempts to move past the respective valves in a direction opposite to the arrows shown.

When hydraulic brake structure of the character just described and illustrated in the accompanying drawings is operated, the manually controlled apparatus may be of a character different from the hydraulic type shown and including piston 38 and its containing cylinder 36. However, under the conditions here disclosed, the hydraulic brake system does include this said piston and cylinder which is joined to a master reservoir, the pressure wherein is controlled by a foot pedal or the like. Upon depressing the foot pedal, the oil in cylinder 36 moves piston 38 radially and in the direction shown by the arrow in Fig. 1.

Such action bodily moves cross head 40, arms 50 and 52, bell-crank levers 72, heads 70, expansion ring 66, and annular brake shoes 58 and 60. Such movement is relative to bushing 26 and roller bearings 32 eliminate friction.

It is notable that drum 10 is completely filled with liquid and as such movement occurs, the space between the outer annular faces of brake shoes 58 and 60 and the inner annular face of side wall 18 of drum 10, approaches the form shown in Fig. 6. Before this ultimate locking position is reached however, bell-crank levers 72 have been shifted by the inclined portions of slots 78 in ears 80 and heads 70 have been moved radially outwardly to increase the diameter of the wedge-shaped expansion ring 66 to thereby force the same between the inclined proximal faces of brake shoes 58 and 60. Such action forces brake shoes 58 and 60 against the end walls 14 and 16 respectively of the brake drum to establish a braking action that is transmitted to the wheel upon which the brake drum is mounted by elements 12. It must be remembered that brake drum 10 is travelling with the wheel and that plunger 92 is serving to move the oil around the axis of the brake drum and in the space formed between the brake shoes and the annular wall of said drum.

As pressure is applied to the manually operable apparatus which is bodily moved, the said group of parts that are shifted closer to that position illustrated in Fig. 6 when pins 76 reach the length of slots 78 that are parallel to arm 50, bell-crank levers 72 no longer increase the pressure upon expansion ring 66. As the space between said brake shoes approaches that form shown in Fig. 6, the back pressure against plunger 92 becomes greater because of the restriction at the closed point between the brake shoes and the wall 18 of the brake drum.

Very fine adjustment and a light touch of the brake is all that is necessary to completely lock together the stationary parts 24 and 26 and the movable parts constituting the drum and plunger 92. When the structure is in the condition illustrated in Fig. 6, oil is compressed and the plunger nor its supporting drum can no longer move. Progressively increasing force is applied to the face of plunger 92 to seal the joint between its face 96 and the outer annular faces of brake shoes 58 and 60. This progressively increasing force is set up because oil passes into plunger 92 past valve 88 when the brake drum is moving in the direction of the arrow shown in Fig. 6, and thence into the plunger. Valve 90 is closed under these conditions.

From the foregoing it will be observed that not only do brake shoes 58 and 60 expand against the ends of the brake drum, but the body radial movement establishes a pressure against plunger 92 which assists the frictional engagement at faces 68 in imparting a braking action.

Upon release of the manually operable apparatus, piston 38 is drawn back to its point of beginning, illustrated in Fig. 1, by springs 48. The oil in drum 10 will equalize itself throughout the interior of the said drum and expansion ring 66 will follow heads 70 to the normal inoperative position.

It is obvious from the foregoing that an exceptionally efficient and rugged hydraulic brake structure has been provided to embody the concepts of this invention, and while one form has been illustrated and described, it is understood that modifications may be made without departing from the scope of the appended claims.

Having thus described the invention, what is claimed as new and desired to be secured by Letters Patent is:

1. Hydraulic brake structure of the character described comprising a drum adapted to be mounted on a rotatable element to which braking action is to be applied; a stationary part extending into the drum at its axis; a pair of brake shoes within the drum and mounted for longitudinal movement toward and from a position respectively against the end walls of said drum; and manually operable apparatus for moving the said brake shoes into frictional engagement with the end walls of the drum, said manually operable apparatus and the brake shoes being radially shiftable within the brake drum.

2. Hydraulic brake structure of the character described comprising a drum adapted to be mounted on a rotatable element to which braking action is to be applied; a stationary part extending into the drum at its axis; a pair of brake shoes within the drum and mounted for longitudinal movement toward and from a position respectively against the end walls of said drum; and manually operable apparatus for moving the said brake shoes into frictional engagement with the end walls of the drum, said manually operable apparatus and the brake shoes being radially shiftable within the brake drum as the brake shoes are longitudinally moved toward the end walls of the drum, the inner face of the side wall of the drum being annular, the outer face of the brake shoes being annular with a portion thereof in contact with a portion of the inner face of the side wall of the drum when the brake structure is fully set.

3. Hydraulic brake structure of the character described comprising a drum adapted to be mounted on a rotatable element to which braking action is to be applied; a stationary part extending into the drum at its axis; a pair of brake shoes within the drum and mounted for longitudinal movement toward and from a position respectively against the end walls of said drum; and manually operable apparatus for moving the said brake shoes into frictional engagement with the end walls of the drum, said manually operable apparatus and the brake shoes being radially shiftable within the brake drum as the brake shoes are longitudinally moved toward the end walls of the drum, the inner face of the side wall of the drum being annular, the outer face of the brake shoes being annular with a portion thereof in contact with a portion of the inner face of the side wall of the drum when the brake structure is fully set, said drum having a plunger shiftably mounted thereon for radial movement toward the outer face of the brake shoes to one side of the portion thereof in contact with the side wall of the brake drum.

4. Hydraulic brake structure of the character described comprising a drum adapted to be mounted on a rotatable element to which braking action is to be applied; a stationary part extending into the drum at its axis; a pair of brake shoes within the drum and mounted for longitudinal movement toward and from a position respectively against the end walls of said drum; and manually operable apparatus for moving the said brake shoes into frictional engagement with the end walls of the drum, said manually operable apparatus and the brake shoes being radially shiftable within the brake drum as the brake shoes are longitudinally moved toward the end walls of the drum, the inner face of the side wall of the drum being annular, the outer face of the brake shoes being annular with a portion thereof in contact with a portion of the inner face of the side wall of the drum when the brake structure is fully set, said drum having a plunger shiftably mounted thereon for radial movement toward the outer face of the brake shoes to one side of the portion thereof in contact with the side wall of the brake drum, said brake drum having a filling of liquid therein, the said plunger having means associated therewith for directing liquid radially and thereagainst when the shoes are against the said drum and the plunger is moved around the brake shoes by the said drum.

5. Hydraulic brake structure of the character described comprising a drum adapted to be mounted on a rotatable element to which braking action is to be applied; a stationary part extending into the drum at its axis; a pair of annular, side-by-side brake shoes mounted on the stationary part for longitudinal movement to and from a position in frictional engagement with the inner faces of the ends of the drum; an expansion ring between the said brake shoes; and manually operable apparatus for moving the said expansion ring into operative position, said expansion ring being sectional and wedge-shaped in transverse cross section, the manually operable apparatus including heads shiftably arranged for movement between the ends of the expansion ring sections to increase the diameter of the said ring.

6. Hydraulic brake structure of the kind set forth in claim 5, wherein each head is carried by a lever having connection with the stationary part and the brake shoes.

7. Hydraulic brake structure of the character described comprising a drum adapted to be mounted on a rotatable element to which braking action is to be applied; a stationary part extending into the drum at its axis; a pair of annular, side-by-side brake shoes mounted on the stationary part for longitudinal movement to and from a position in frictional engagement with the inner faces of the ends of the drum; an expansion ring between the said brake shoes; radially shiftable arms supporting the brake shoes upon the stationary part and adapted to permit said longitudinal movement; and means operable upon said radial shifting of the arms for forcing the expansion ring between the pair of brake shoes to force the same into frictional engagement with the end walls of the drum.

8. Hydraulic brake structure of the character described comprising a drum adapted to be mounted on a rotatable element to which braking action is to be applied; a stationary part extending into the drum at its axis; a pair of annular, side-by-side brake shoes mounted on the stationary part for longitudinal movement to and from a position in frictional engagement with the inner faces of the ends of the drum; an expansion ring between the said brake shoes; radially shiftable arms supporting the brake shoes upon the stationary part and adapted to permit said longitudinal movement; and means operable upon said radial shifting of the arms for forcing the expansion ring between the pair of brake shoes to force the same into frictional engagement with the end walls of the drum, said last mentioned means being formed to force the expansion ring between the pair of brake shoes during a part of its radial path of travel as the said brake shoes, the expansion ring, and the said arms travel together and to bodily move the said brake shoes, the said expansion ring, and the said arms further toward the annular side wall of the drum without relatively moving the expansion ring and the brake shoes.

9. In a hydraulic brake structure of the character described, a rotatable drum; a pair of relatively non-rotatable, longitudinally expansible brake shoes substantially concentric with the inner annular face of the drum and spaced therefrom when the brake structure is inoperative; a filling of liquid within the drum; a radially disposed plunger on the drum mounted for movement toward and from the outer annular faces of the brake shoes; and manually operable apparatus for moving the brake shoes longitudinally against the ends of the brake drum and simultaneously radially thereof, said plunger being contained in a housing having valved passageways formed to direct liquid against the plunger and force the same against the said brake shoes when the brake shoes have been radially shifted into engagement with the side of the brake drum.

10. A hydraulic brake structure as defined in claim 9, wherein the valves in the passageways are adapted to direct liquid against the plunger from either side thereof depending upon the direction of rotation of the drum.

WILLIAM W. CARTER.